United States Patent [19]

Yasuda et al.

[11] 4,047,221
[45] Sept. 6, 1977

[54] INTERFRAME CODING APPARATUS

[75] Inventors: Hiroshi Yasuda, Tokorozawa; Fumio Kanaya, Tokyo, both of Japan

[73] Assignee: Nippon Telegraph and Telephone Public Corporation, Tokyo, Japan

[21] Appl. No.: 728,082

[22] Filed: Sept. 30, 1976

[30] Foreign Application Priority Data

Oct. 6, 1975    Japan ................................ 50-120458

[51] Int. Cl.² ............................................. H04N 7/12
[52] U.S. Cl. ....................................... 358/136; 358/85
[58] Field of Search ............ 179/2 TS, 2 TV; 358/85, 358/136, 141

[56] References Cited

U.S. PATENT DOCUMENTS

| 3,962,535 | 6/1976 | Haskell | 358/136 |
|---|---|---|---|
| 4,006,297 | 2/1977 | Koga | 358/136 |

Primary Examiner—John C. Martin
Assistant Examiner—Aristotelis M. Psitos
Attorney, Agent, or Firm—Sughrue, Rothwell, Mion, Zinn and Macpeak

[57] ABSTRACT

In interframe coding apparatus in which an input signal is encoded by an interframe coder and its output code is written in a buffer memory, and is read out therefrom at a constant bit rate, a variable characteristics comb filter is provided at a stage preceding the interframe coder. The period of the frequency characteristics of the comb filter is selected to be the frame period of the input signal. By a controller, the occupancy of the buffer memory is detected to control either one or both of the attenuation in the elimination band and high frequency cut-off characteristics of the comb filter detected value to prevent an overflow from the buffer memory.

8 Claims, 10 Drawing Figures

INTERFRAME CODING APPARATUS

BACKGROUND OF THE INVENTION

This invention relates to interframe coding apparatus for the transmission of a video signal in the form of a digital signal, which compresses the frequency bandwidth of the signal by utilizing a high interframe correlation of the signal.

The PCM system is the simplest method of converting a video signal into a digital code, but requires a high bit rate of 64Mb/s for a monochrome television signal of 4MHz and a high bit rate above 80Mb/s for a color television signal of 4.2KHz, resulting in high transmission cost. To avoid this, there have been developed the DPCM system and ΔM system utilizing an inframe correlation but their bit rate is merely one-half of that of the PCM system. Also, the interframe coding system utilizing an interframe correlation has been developed for further reduction of the bit rate.

With the interframe coding system, only information of a change in a frame with respect to its predecessor is transmitted, and since this information does not occur uniformly, it is once stored in a buffer memory, and thence delivered out to a transmission line at a constant bit rate. Accordingly, in the case of a rapid change in the frame, the amount of information to be transmitted is increased, which results in an overflow from the buffer memory to cause the picture quality of a reproduced picture to be appreciably impaired. For the prevention of occurrence of the overflow, only a little reduction of the bit rate is possible. On the other hand, a buffer memory having a sufficient capacity to prevent such an overflow may be used, but is not preferred in the case of a video telephone because of too much a delay of the picture signal relative to the voice signal. In view of this, the so-called FRODEC system has been proposed, as described, for example, in an article "Transmitting Television as Clusters of Frame-to-Frame Difference" by J. C. Candy et al. on Bell System Technical Journal Vol. 50, No. 6. According to this system, the difference between the input signal and a signal from a frame memory, which exceeds a threshold value, is encoded and supplied to the buffer memory, and as the buffer memory is approaching its full capacity, the threshold value is increased to reduce the signal which is supplied to the buffer memory. With such a system, the bit rate can be reduced to about one-tenth of that of the PCM signal. However, transmission even at such a bit rate is still appreciably costly as compared with voice transmission. Further reduction of the bit rate by the FRODEC system can be achieved by greatly increasing the threshold value, but this considerably increases the generation of quantizing noise, resulting in degraded picture quality of the reproduced picture.

This invention has for its object to provide interframe coding apparatus which is capable of further reduction of the bit rate without substantial degradation of the picture quality of the reproduced picture.

SUMMARY OF THE INVENTION

According to this invention, in interframe coding apparatus in which an input signal is encoded by an interframe coder and its output code is written in a buffer memory, and is read out therefrom at a constant bit rate, a variable characteristics filter is provided at a stage preceding the interframe coder and the occupancy of the buffer memory is detected to provide a control over the filtering characteristic of the variable characteristics filter in accordance with the detected output. The variable characteristics filter is preferred to be a filter of comb-shaped frequency characteristic which has substantially the same period as the input signal, that is, the frame period or line period. The attenuation in the elimination band of the comb filter is controlled by the abovesaid detected output. Namely, as this attenuation increases to approach an ideal comb filter, only frequency components which are integral multiples of the frame period, for example, pass through the comb filter, that is, the spectrum of the picture derived from the filter approaches the frequency spectrum of the video signal of a still picture, and the amount of the coded output information from the interframe coder is reduced. Further, the comb filter is controlled to cut off high-frequency components while maintaining its comb characteristic and the cut-off frequency is lowered with an increase in the occupancy of the buffer memory, by which movement of a small pattern in a frame is blurred to result in reduction of the amount of coded output information. It is also possible to achieve the control of either one or both of the attenuation and the cut-off characteristic. In the case of controlling a coding parameter of the interframe coder in accordance with the occupancy of the buffer memory as in the FRODEC system described above, a signal for controlling the coding parameter may be used as a control signal for the aforesaid variable characteristics filter. Also, the variable characteristics filter may be formed with digital circuits or analog circuits.

BRIEF DESCRIPTION OF THE INVENTION

DETAILED DESCRIPTION OF THE PREFERRED EMBODIMENTS

Figure 1:
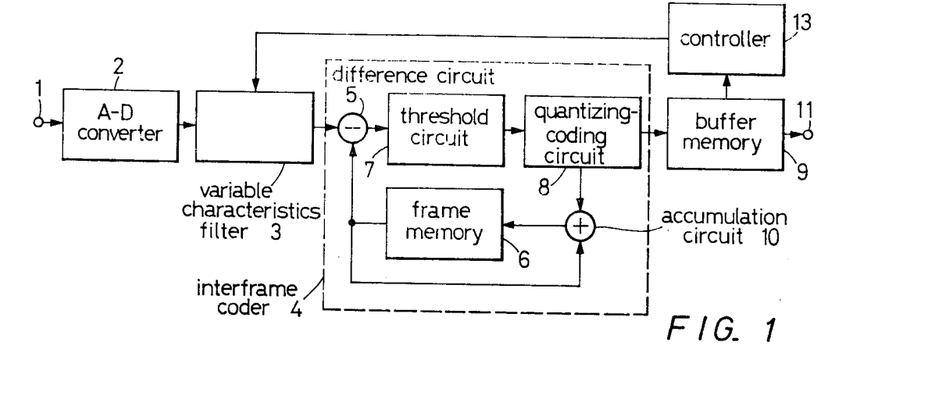
FIG. 1 is a block daigram showing the principle of the interframe coding apparatus of this invention.

An input television signal, for example, applied to an input terminal 1, is supplied therefrom to an A-D converter 2 in which the input signal is sampled for each picture element, and converted into an 8-bit PCM signal. The PCM signal output is supplied to an interframe coder 4 through a variable characteristics filter 3 forming the principal part of this invention. In the interframe coder 4, the difference is taken by a difference circuit 5 between the input signal and a local decoder output (described later) of the corresponding picture element of the immediately preceding frame which is read out from a frame memory 6. The difference signal thus obtained is applied to a threshold circuit 7, which produces a signal exceeding a given threshold value. The output signal from the threshold circuit 7 is quantized by a quantizing-coding circuit 8 to produce, for example, a 4-bit quantized code, which is once stored as the output of the coder 4 in a buffer memory 9. A 9-bit PCM signal representing the quantized value is supplied from the quantizing-coding circuit 8 to an accumulation circuit 10, and added with the corresponding picture element output read out from the frame memory 6, and the added value, i.e. a local decoder signal, is written in the frame memory 6. The local decoder signal thus written in the frame memory 6 is read out therefrom after one frame. Accordingly, the buffer memory 9 writes therein in the coded form only a change in a frame with respect to the previous frame. The code thus written in the buffer memory 9 is read out therefrom at a uniform bit rate to an output terminal 11.

Upon application of a signal of a frame containing many changes, the amount of the output information of the interframe coder 4 increases and the amount of information to be stored in the buffer memory 9 exceeds its full capacity to cause an overflow. With the aforementioned FRODEC system, as the buffer memory 9 is approaching its full capacity, the threshold value of the threshold circuit 7 is increased to reduce the amount of coded output from the interframe coder 4. If the bit rate is sufficiently reduced by this system alone, the picture quality of the reproduced picture is remarkedly deteriorated.

In the present invention, the occupancy of the buffer memory 9 is detected by a controller 13 to control the filtering characteristic of the variable characteristics filter 3 in accordance with the detected occupancy, whereby the amount of coded output from the interframe coder 4 is decreased with an increase in the amount of information stored in the buffer memory 9. The control of the filtering characteristic is accomplished by either one or both of a control of approximation of the spectrum of the picture output of the filter to the frequency spectrum of a still picture, and a control of cutting off high-frequency components of the spectrum of the picture output of the filter.

Figure 2:
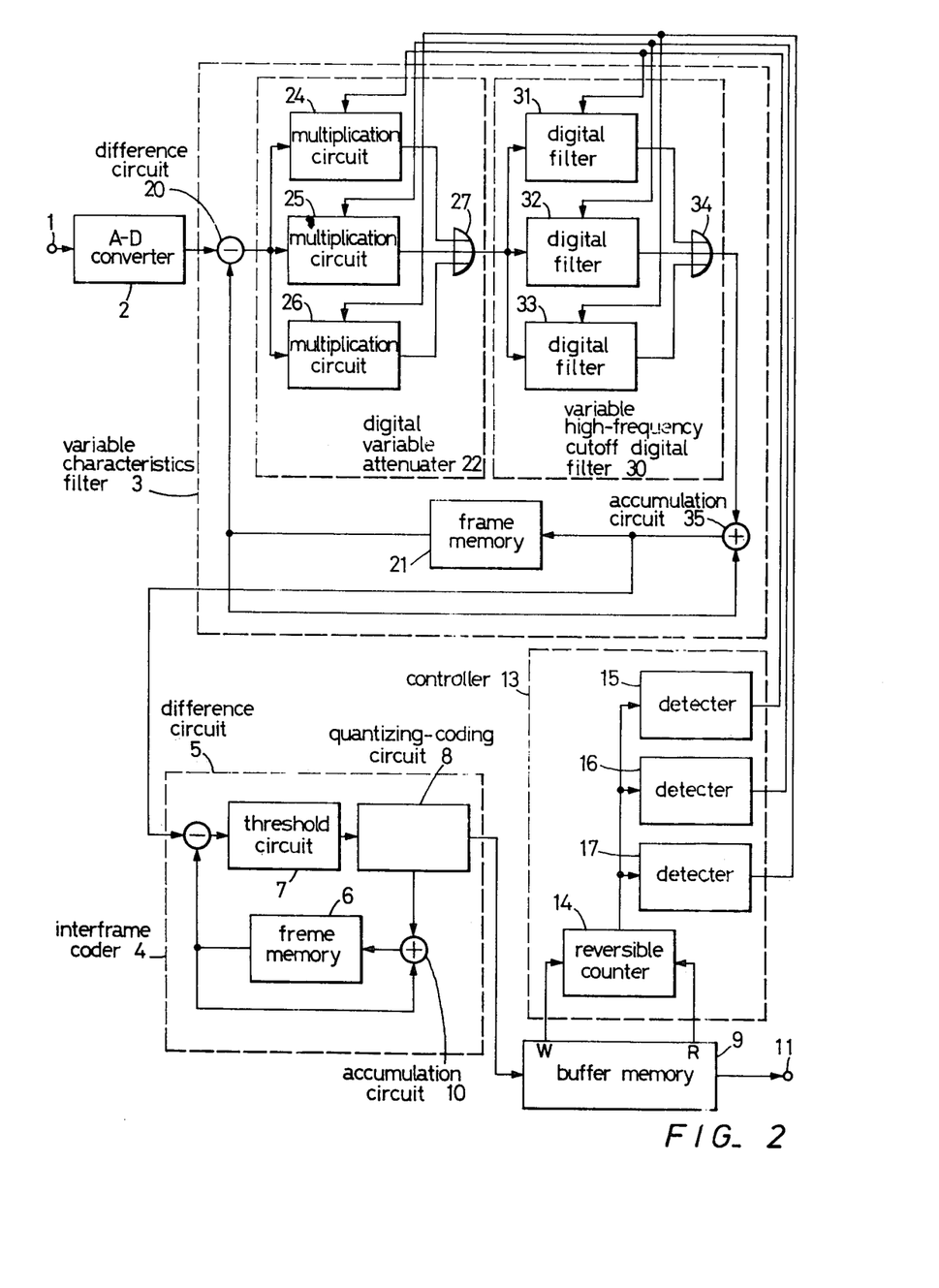
FIG. 2 is a block diagram illustrating an embodiment of the interframe coding apparatus of this invention.

FIG. 2 illustrates an embodiment of this invention, in which parts corresponding to those in FIG. 1 are identified by the same reference numerals. In the controller 13, for example, a reversible counter 14 is provided, which is adapted for forward counting at every inputting of one bit into the buffer memory 9 and for backward counting at every outputting of one bit from the buffer memory 9. Accordingly, the count value of the counter 14 is indicative of the amount of information stored in the buffer memory 9. If the total capacity of the buffer memory 9 is taken as K, it is detected by detectors 15, 16 and 17 that the count number of the counter 14 is, for example, 0 K/3, K/3 to 2K/3 and 2K/3 to K, respectively.

The variable characteristics filter 3 is shown to be forward as a digital comb filter. In a difference circuit 20, the difference is detected between the output signal from the A-D converter 2 and a signal of the corresponding picture element of the preceding frame which is read out from a delay circuit having a delay time equal to the frame period of the input signal, for example, a frame memory 21. The resulting difference signal, that is, a change in the frame, is supplied to a digital variable attenuator 22. The attenuator 22 is comprised, for example, of multiplication circuits 24, 25 and 26, in which the output from the difference circuit 20 is multiplied by $k_1$, $k_2$ and $k_3$, respectively. These coefficients are selected such that $k_1 > k_2 > k_3$. The multiplication circuits 24, 25 and 26 are respectively supplied with the outputs from the detectors 15, 16 and 17. The output from only one of the multiplication circuits, supplied with the output from one of the detectors, is delivered as the output of the attenuator 22 through an OR circuit 27. Consequently, in the attenuator 22, the difference signal is attenuated $k_1$, $K_2$ and $k_3$ times, respectively, in the cases where the occupancy of the buffer memory 9 is in the ranges of 0 to K/3, K/3 to 2K/3 and 2K/3 to K.

The output from the attenuator 22 is supplied to a variable high-frequency cut-off digital filter 30. In the filter 30, the output from the attenuator 22 is supplied to digital filters 31, 32 and 33, whose cut-off frequencies are selected to be sequentially lower. The filters 31, 32 and 33 are respectively controlled by the outputs of the controllers 15, 16 and 17, and only the output of the filter supplied with the controller output is applied as the output of the variable filter 30 to an accumulation circuit 35 through an OR circuit 34. In the accumulation circuit 35, the output of the digital filter 30 is added with the corresponding signal of the preceding frame which is read out from the frame memory 21. The added output is supplied as the output of the filter 3 to the interframe coder 4 and, at the same time, to the frame memory 21, and is read out therefrom after one frame.

The filter 3 exhibits a comb frequency characteristic having a period equal to the frame period $T_F$ of the input signal. Assuming that the cut-off frequency of the filter 30 is infinity, that is, the output of the attenuator 22 is applied directly to the accumulation circuit 35, those bands which are integral multiples of $1/T_F$ become pass bands and the intermediate bands are elimination bands and the attenuation is varied by the selection of the multiplication circuits 24, 25 and 26. When the filter 30 is connected, the high-frequency components in the elimination band of the comb filtering characteristic is cut off.

Figure 3:
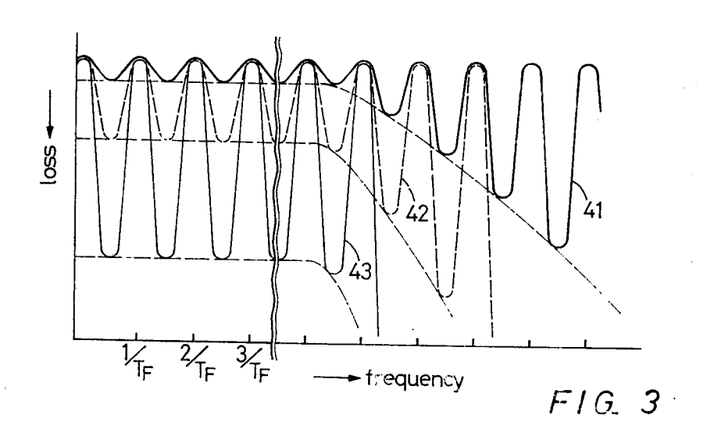
FIG. 3 is a graph showing the frequency characteristics of a variable characteristics filter.

FIG. 3 shows one examples of the frequency characteristics of the variable characteristics filter 3, the abscissa representing frequency and the ordinate loss. In FIG. 3, the curve 41 indicates the case where the output of the multiplication circuit 24 is supplied to the accumulation circuit through the filter 31; and the curve 42 indicates the case where the outputs of the multiplication circuit 25 and the filter 32 are selected and, in this case, as the attenuation in the elimination band of the comb characteristic increases, the higher cut-off frequency becomes lower. The curve 43 indicates the case where the multiplication circuit 26 and the filter 33 are selected, and, in this case, the attenuation in the elimination band of the comb characteristic further increases and the higher cut-off frequency becomes further lowered, as shown.

Figure 4:
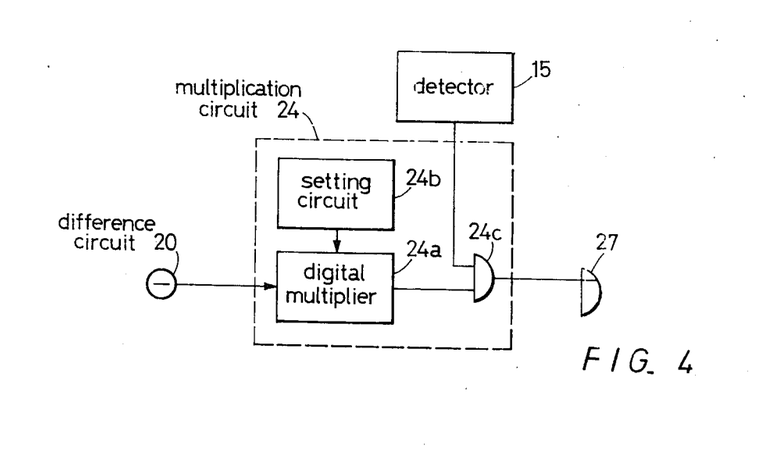
FIG. 4 is a block diagram illustrating one example of a multiplication circuit.

The multiplication circuit 24 is constructed, for example, as illustrated in FIG. 4. The output from the difference circuit 20 is supplied to a digital multiplier 24a, and multiplied by a digital quantity $k_1$ set in a setting circuit 24b, and when a gate 24c is opened by the output from the detector 15, the output from the multiplier 24a is supplied to the OR circuit 27 through the gate 24c. The other multiplication circuits 25 and 26 can also be constructed in the same form as described above.

Figure 5:
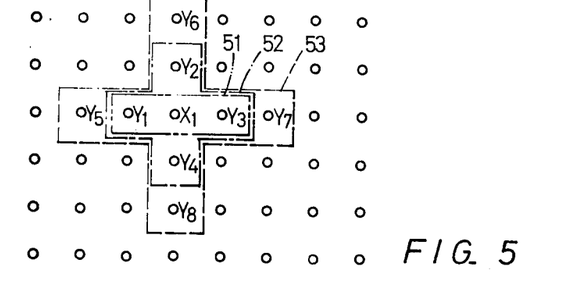
FIG. 5 is a diagram showing a picture element allocation, explanatory of the operation of a digital filter.

Each of the digital filters used in the variable high-frequency cut-off digital filter 30 is to average the picture element of the input signal and signals of neighboring picture elements, and as the cut-off frequency becomes lower, the number of the picture elements averaged increases. In FIG. 5 showing the picture element allocation of one part of a frame, the picture element of the code now outputted from the difference circuit 20 is indicated by $X_1$; two preceding and two succeeding picture elements on the same horizontal scanning line as the picture element $X_1$ are designated by $Y_1$, $Y_5$ and $Y_3$, $Y_7$, respectively; and the corresponding picture elements on two preceding and two succeeding horizontal scanning lines are indicated by $Y_2$, $Y_6$ and $Y_4$, $Y_8$, respectively. The filter 31 performs the following operation:

$$\frac{2X_1 + Y_1 + Y_3}{4}$$

to thereby average the picture elements in an area 51 in FIG. 5; the filter 32 performs the following operation:

$$\frac{4X_1 + Y_1 + Y_2 + Y_3 + Y_4}{8}$$

to thereby average the picture elements in an area 52; and the filter 33 performs the following operation:

$$\frac{12X_1 + 4Y_1 + 4Y_2 + 4Y_3 + 4Y_4 + Y_5 + Y_6 + Y_7 + Y_8}{32}$$

to thereby average the picture elements in an area 33.

Figure 6:
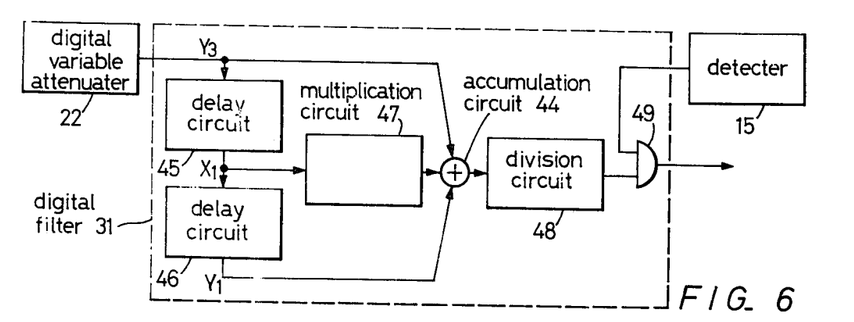
FIGS. 6, 7 and 8 are block diagrams respectively illustrating examples of the digital filter.

In the filter 31, as depicted, for example, in FIG. 6, the output from the variable attenuator 22 is supplied to an accumulation circuit 44 directly and, at the same time, through a series connection of delay circuits 45 and 46 having a delay time of one picture element period. The output from the delay circuit 45 is doubled by the circuit 47, and is then supplied to the accumulation circuit 44. The output from the accumulation circuit 44 is divided by 4 in a division circuit 48, and is then applied to a gate 49, which is controlled by the output from the detector 15. When the signal of the picture element $X_1$ is obtained at the output side of the delay circuit 49, the signals of the picture elements $Y_1$ and $Y_3$ are derived at the output side of the delay circuit 46 and at the input side of the delay circuit 45, respectively, and the output from the divide circuit 48 becomes an averaged output of the area 51 in FIG. 5.

Figure 7:
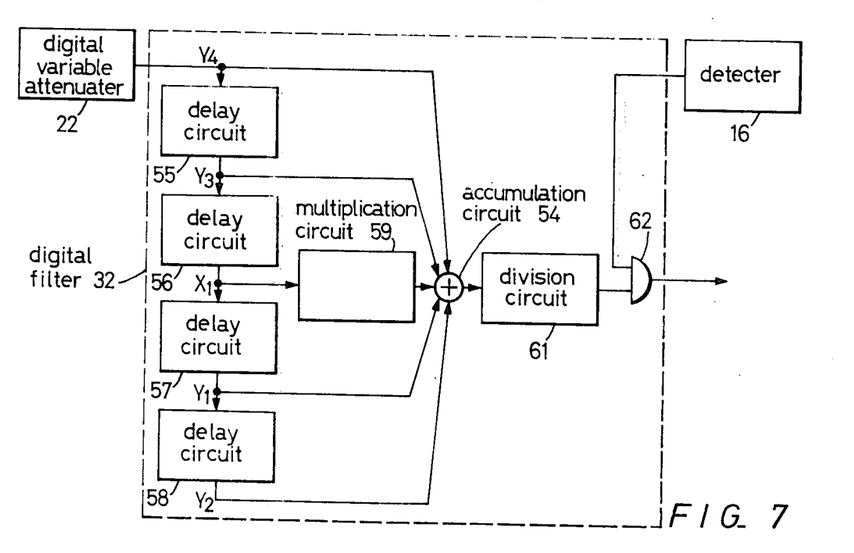

The filter 32 is constructed as shown in FIG. 7. The output from the variable attenuator 22 is supplied to an accumulation circuit 54 directly and, at the same time, via a series connection of delay circuits 55, 56, 57 and 58. The accumulation circuit 54 is further supplied with the outputs from the delay circuits 55 and 57 and the output from the delay circuit 56 which is multiplied four times by a circuit 59. The output from the accumulation circuit 54 is divided by 8 in a divide circuit 61, and is then supplied to a gate 62, which is controlled by the output from the detector 16. The amount of delay of each of the delay circuits 55 and 58 is selected to be such a value that one picture element period is subtracted from one line period of the input signal. The amount of delay of each of the delay circuits 56 and 57 is selected to be one picture element period of the input signal. When the output from the delay circuits 56 is $X_1$, the outputs from the delay circuits 57, 58 and 55 are $Y_1$, $Y_2$ and $Y_3$ and the input to the delay circuit 55 is $Y_4$ and the average output of the area 52 in FIG. 5 is derived at the output of the divide circuit 61.

Figure 8:
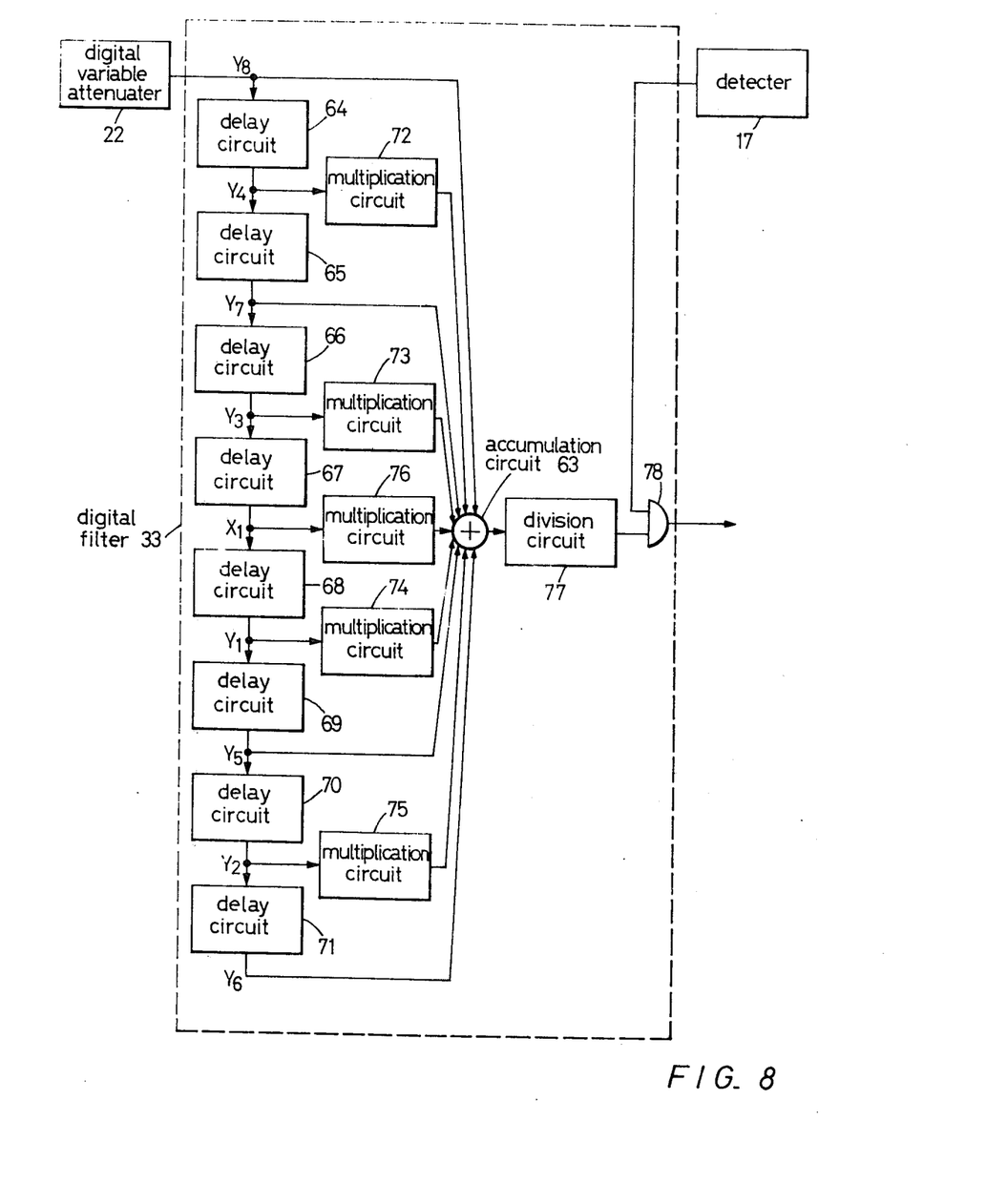

The filter 33 is constructed as depicted in FIG. 8. The output from the attenuator 22 is supplied to an accumulation circuit 63 and a series circuit of delay circuits 64 to 71. The outputs from the delay circuits 64, 69 and 71 are supplied, as they are, to the accumulation circuit 63, but the outputs from the delay circuits 64, 66, 68 and 70 are respectively multiplied four times by circuits 72, 73, 74 and 75, and then applied to the accumulation circuit 63. Further, the output from 67 is multiplied 12 times by a circuit 67, and then supplied to the accumulation circuit 63. The output from the accumulation circuit 63 is divided by 32 in a divide circuit 77 and the divided output is applied to a gate 78. The gate 78 is placed under the control of the output from the detector 17. The amounts of delay of the delay circuits 64 and 71 are each selected to be such a value that two picture element periods are subtracted from one line period; and the amounts of delay of the delay circuits 66, 67, 68 and 69 are each selected to be one picture element period. When the output from the delay circuit 67 is $X_1$, the outputs from the delay circuits 64, 65, 66, 68, 69, 70 and 71 are $Y_4$, $Y_7$, $Y_3$, $Y_1$, $Y_5$, $Y_2$ and $Y_6$, respectively, and the input to the delay circuit 64 is $Y_8$, and the output from the divide circuit 77 is an averaged output of the area 53 in FIG. 5.

In the case of simultaneously controlling the attenuator 22 and the filter 30 by the detectors 15, 16 and 17, it is also possible to apply the outputs from the digital multiplication circuits 24, 25 and 26 in FIG. 2 directly to the filters 31, 32 and 33, respectively, to control the gates 49, 62 and 78 in FIGS. 6 to 8, with those gates of the digital multipliers corresponding to the gate 24c shown in FIG. 4 being omitted.

Turning back to FIG. 2, the occupancy of the buffer memory 9 is detected by any one of the detectors 15, 16 and 17, and the attenuator 22 and the filter 30 are controlled by the detector output, and the filter 3 exhibits any one of the characteristics indicated by the curves 41, 42 and 43 in FIG. 3. This changes as the amount of information stored in the buffer memory 9 increases. That is, as the frequency spectrum of a still picture is approached, the higher frequency components are eliminated, so that the amount of coded output from the interframe coder 4 decreases. As a result of this, there is no likelihood of occurrence of an overflow from the buffer memory 9. This is not to control the coding parameter of the coder 4. As discribed above, the control by the attenuator 22 is to approach the output signal to the still picture, in other words, this control is to decrease changes in a frame of many changes but does not generate noises, so that the picture quality of the reproduced picture is not degraded. The frequency characteristic of noise contained in the input signal is flat with respect to frequency, and the noise is suppressed by the elimination band of the comb filter, so that the noise is decreased to provide for enhanced picture quality. Further, the control of the filter 30 is to remove motion of a small pattern in the frame but since such motion is imperceptible by nature to the visual system, the picture quality is not so much deteriorated. Especially in the case of encoding of the output from the difference circuit 5 by the DPCM system in the interframe coder 4, it is advantageous that the amount of high-frequency components contained in the output from the difference circuit 5 is small. From this point of view, the control of the filter 30 is effective. As is evident from the above description, it is preferred to finely detect the occupancy of the buffer memory 9 and control the filter 30 and then the attenuator 22. It has been experimentally ascertained that even if the bit rate is made lower than 1/50 of that in the conventional PCM system by detecting the occupancy of the buffer memory 9 in eight grades and controlling only the attenuator 22 by one of eight factors of 1, 7/8, 6/8, ... 1/8 without controlling the filter 30, the picture quality is little degraded.

Figure 9:
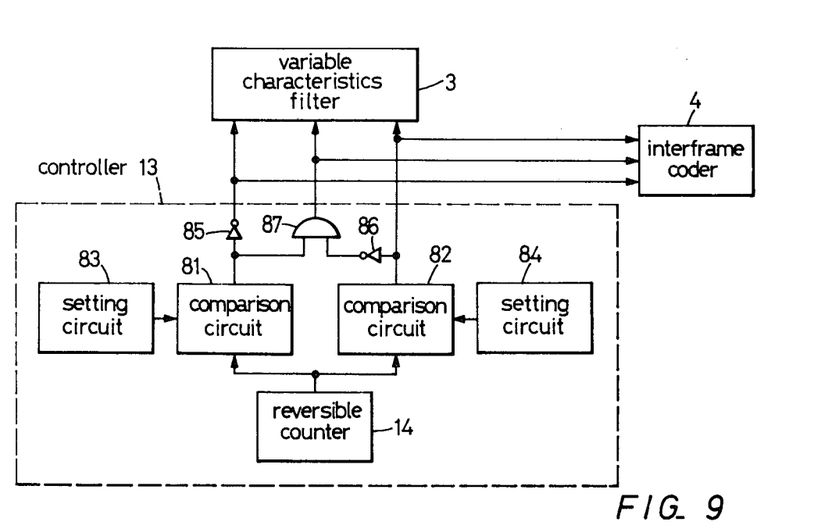
FIG. 9 is a block diagram illustrating one example of a controller.

The controller 13 may also be constructed as shown in FIG. 9, in which the count number of the reversible counter 14 is compared with set values K/3 and 2K/3 of circuits 83 and 84 in comparison circuits 81 and 82, respectively, and when the count number is larger than the set values, the comparison circuits each produce an output 1. Where the count number is less than K/3, the comparison circuit 81 derives therefrom an output 0, which is inverted by an inverter 85 to provide a signal for selecting the multiplication circuit 24 and the filter 31 in FIG. 2. In the case where the count number is in the range from K/3 to 2K/3, the output 1 from the comparison circuit 81 and an output 0 from the comparison circuit 82, inverted by an inverter 86, are ANDed with each other in a circuit 87, whose output selects the multiplication circuit 25 and the filter 32. Where the count number of the reversible counter 14 is larger than 2K/3, the comparison circuit 82 produces an output 1, by which the multiplication circuit 26 and the filter 33 are selected. In the present example, the threshold value control signal for the threshold circuit 7 of the interframe coder 4 in the aforesaid FRODEC system is provided by the output from the controller 13. In place of controlling the threshold value of the threshold circuit 7, it is also possible to insert a variable attenuator at the output side of the difference circuit 5 and control its attenuation.

Figure 10:
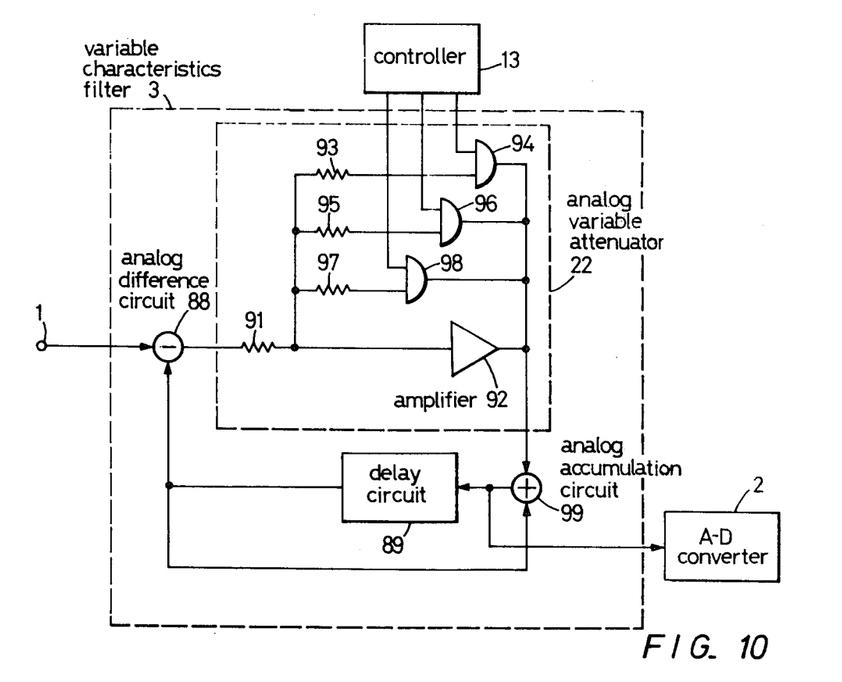
FIG. 10 is a block diagram showing another embodiment of the interframe coding apparatus of this invention.

In the foregoing, the variable characteristics filter 3 has been described to be a digital filter, but may also be an analog filter and inserted at a stage preceding the A-D converter 2 in FIG. 2. For example, as illustrated in FIG. 10, the difference is detected by an analog difference circuit 88 between an input signal to the analog variable characteristics filter 3 and the output from a delay circuit 89 having a delay time equal to one frame period, and the difference output is supplied to an analog attenuator 22. That is, the output from the difference circuit 88 is supplied to an amplifier 92 through an input resistor 91 and, between the input and output of the amplifier 92, there are connected in parallel negative feedback circuits respectively consisting of a resistor 93 and a gate 94, a resistor 95 and a gate 96, and a resistor 97 and a gate 98. The gates 94, 96 and 98 are respectively controlled by the outputs from the detectors 15, 16 and 17, by which the ratios between the resistance value of the input resistor 91 and those of the resistors 93, 95 and 97 are made, for example, $k_1 = 7/3$, $k_2 = 4/8$ and $k_3 = 1/8$, respectively. The output from the amplifier 92 is added with the output from a delay circuit 89 in an analog accumulation circuit 99, and the sum is supplied to the delay circuit 89 and to the A-D converter 2. It will readily be understood that also in this case, the filter 3 exhibits the comb frequency characteristics and that is attenuation is controlled in accordance with the occupancy of the buffer memory 9. In the case where the variable high-frequency cut-off filter 30 shown in FIG. 2 is formed with an analog filter, it is sufficient only to construct the delay circuits, multiplication circuits, the divide circuits and accumulation circuits in FIGS. 6 to 9 in the form of analog circuits.

Although the foregoing description has been given with regard to the case where a comb filter having a period equal to the frame period of an input signal is employed as the variable characteristics filter 3, it is also possible to use a comb filter having a period equal to the line period of the input signal and, in this case, the amount of delay of each of the delay circuits 21 and 89 is selected to be one line period. Further, it is also possible to change the positions of the variable attenuator 22 and the variable high-frequency filter 30 with each other.

It will be apparent that many modifications and variations may be effected without departing from the scope of the novel concepts of this invention.

What is claimed is:
1. Interframe coding apparatus comprising:
   a variable characteristics filter supplied with an input signal and capable of changing its filtering characteristic with a control signal;
   a coder connected to the output side of the variable characteristics filter to encode the filtered output into an interframe code;
   a buffer memory connected to the output side of the coder, the output code of the coder being written in the buffer memory and read out therefrom at a constant bit rate; and
   a controller connected between the buffer memory and the variable characteristics filter to detect the occupancy of the buffer memory and generate the control signal.

2. Interframe coding apparatus according to claim 1, wherein the variable characteristics filter is a comb filter of comb frequency characteristics having substantially the same period as the input signal.

3. Interframe coding apparatus according to claim 2, wherein the comb filter comprises a delay circuit having a delay time equal to the input signal period, a difference circuit for obtaining the difference between the output from the delay circuit and the input signal, a variable attenuator connected to the output side of the difference circuit to be controlled by the control signal, and an accumulation circuit for obtaining the sum of the attenuated output from the variable attenuator and the output from the delay circuit to provide a filtered output and, at the same time, supply the sum to the delay circuit.

4. Interframe coding apparatus according to claim 2, wherein the comb filter comprises a delay circuit having a delay time equal to the input signal period, a difference circuit for obtaining the difference between the output from the delay circuit and the input signal, a variable cut-off filter connected to the output side of the difference circuit and havings its high-frequency cut-off characteristic controlled by the control signal, and an accumulation circuit for obtaining the sum of the output from the variable cut-off filter and the output from the delay circuit to provide an output of the comb filter and, at the same time, supply the sum to the delay circuit.

5. Interframe coding apparatus according to claim 2, wherein the comb filter comprises a delay circuit having a delay time equal to the input signal period, a difference circuit for obtaining the difference between the output from the delay circuit and the input signal, a cascade connection of a variable attenuator controlled by the control signal and a variable cut-off filter having its high-frequency cut-off characteristic controlled by the control signal, the cascade connection being supplied with the output from the difference circuit, and an accumulation circuit for obtaining the sum of the output of the cascade connection and on the output from the delay circuit to provide an output from the comb filter and, at the same time, supply the sum to the delay circuit.

6. Interframe coding apparatus according to claim 2, wherein the comb filter is a digital circuit.

7. Interframe coding apparatus according to claim 2, wherein the comb filter is an analog circuit.

8. Interframe coding apparatus according to claim 1, wherein the coder has its coding parameter controlled in accordance with the occupancy of the buffer memory to prevent an overflow therefrom and the controller also performs the function of a circuit for generating a control signal for controlling the coding parameter.

* * * * *